United States Patent [19]
Shendure

[11] 3,777,782
[45] Dec. 11, 1973

[54] DOUBLE ENDED SHUT OFF COUPLING

[75] Inventor: Ashok S. Shendure, Warrensville Heights, Ohio

[73] Assignee: Crawford Fitting Company, Solon, Ohio

[22] Filed: June 15, 1972

[21] Appl. No.: 263,007

[52] U.S. Cl............................ 137/614.02, 251/149.9
[51] Int. Cl................................................ F16l 37/28
[58] Field of Search................... 137/614, 614.01, 137/614.02, 614.03, 614.04, 614.05, 614.06, 535, 539.5, 540, 542, 543.17; 251/149.6, 149.7, 149.9

[56] References Cited
UNITED STATES PATENTS

| 2,821,412 | 1/1958 | Frye | 137/614.03 |
|---|---|---|---|
| 2,538,259 | 1/1951 | Merriman | 137/614.03 X |
| 2,498,104 | 2/1950 | Brandau et al. | 137/614.03 |
| 2,485,006 | 10/1949 | Main, Jr. et al. | 137/614.03 |
| 2,449,938 | 9/1948 | Hansen | 137/614.03 |
| 3,174,508 | 3/1965 | Zahuranec | 137/614.04 |

*Primary Examiner*—Samuel Scott
*Assistant Examiner*—Ira S. Lazarus
*Attorney*—Albert P. Sharpe, III

[57] ABSTRACT

The specification and drawings disclose a double ended quick connect shut off coupling which includes a hollow-valved male stem which releasably connects to a hollow-valved female body by a ball-type detent arrangement. The male stem is provided with a valve having a portion which extends out of the stem. The hollow female body includes a plug-type valve member spring biased toward the end of the coupling and having a flat end face with a peripheral lip or flange. The end of the male stem is arranged so as to be received within the lip when the bodies are interconnected. The configuration of the plug is such that a substantially longer biasing spring can be used and valve flutter or chatter eliminated.

7 Claims, 4 Drawing Figures

DOUBLE ENDED SHUT OFF COUPLING

The subject invention is directed toward the tube coupling art and, more particularly, to an improved quick-connect tube coupling.

U. S. Pat. No. 3,174,508 discloses a double-ended tube coupling which is particularly suited for rapid connection and disconnection of tubes, hoses or the like. Broadly, the coupling, shown in the patent, comprises a hollow-valved male stem which releasably connects to a hollow-valved female body. Releasable detent means are provided to allow the male stem to be positively interconnected in the female body. The hollow male stem is provided with a valve with a movable operating portion which extends outwardly of the end of the stem and is acted on by spring means of one force magnitude to urge the valve stem closed. The hollow female body portion has a body valve in the form of a ball which is acted on by spring means of an opposite and greater force magnitude to urge the body valve closed. The spring urged operating portion of the stem valve abuts the body valve during coupling to open the stem valve by means of the opposite and greater force magnitude acting to urge the body valve closed. When uncoupled, both the body valve and the stem valve are, of course, moved to close positions.

The described coupling arrangement is particularly suitable for most uses; however, it has been found that under certain flow conditions, the ball tends to undergo some lateral movement which can produce flutter and vibrations. Additionally, it is difficult because of the somewhat large amount of axial space required for the ball, to select a spring having a spring constant such that the valve can be used for either high pressure or vacuum operations. Consequently, different springs must generally be selected depending upon whether the valve is to be used in a pressure or vacuum system. This problem can be overcome by using a longer spring. However, this particular solution is not satisfactory since it requires substantially increasing the length of the coupling. Additionally, various types of internal cages and the like can be provided to prevent ball flutter but this merely complicates and increases the cost of the coupling.

The present invention provides a uniquely designed quick connect coupling which overcomes the above problems without adding to the complexity of the coupling. Additionally, because of its internal structure, the coupling can be made extremely short and compact.

In accordance with one aspect of the subject invention, the coupling utilizes a specially designed plug or poppet valve member for the internal valve of the female body portion. The poppet valve member is arranged with an end face which engages both the end of the stem and the operating portion of the stem valve. A short flange axially extends from the end face and engages about the periphery of the stem so that during engagement of the coupling members, the poppet is prevented from having any lateral movement. The face of the end poppet has a central recess which receives the end of the stem to prevent lateral movement of the poppet when it is in the open position. Further, the sealing face on the poppet or body valve member is a continuous, annular arcuate face which extends circumferentially about the planar face with an arc corresponding generally to the previously used ball. This allows the poppet member to be placed directly into the prior valve. Additionally, the rear face of the poppet is provided with a shoulder which extends radially inward from the terminus of the arcuate sealing face to a conical stem portion which extends into the biasing spring for the body valve. This allows the effective axial length of the body valve to be much less than the prior used ball and permits the biasing spring to be increased in length without increasing the length of the female body. As a consequence, a single spring can be selected which has the proper constant for use for either vacuum or high pressure operation. Additionally, this is accomplished without any increase in the length of the coupling. An additional factor is that the arrangement provides more rapid opening of the body valve during a coupling operation and improves the flow path through the coupling.

Accordingly, a primary object of the invention is the provision of an improved double-ended quick connect coupling capable of being used throughout a wide range of positive fluid pressures and vacuums.

Yet another object is the provision of a double-ended quick connect coupling of the general type described having improved flow characteristics and absence of internal valve vibrations.

A still further object of the invention is the provision of a double-ended quick connect coupling wherein the body valve is contoured so as to provide improved flow characteristics and more rapid operation.

A still further object is the provision of a coupling of the general type described wherein there is a positive engagement between the male stem and the body valve to eliminate the possibility of any chatter, flutter or other lateral movement of the body valve.

These and other objects and advantages will become apparent from the following description when read in conjunction with the accompanying drawings wherein.

Figure 1:
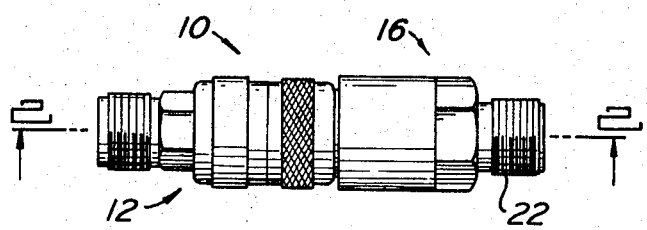
FIG. 1 is a side view of a coupling formed in accordance with a preferred embodiment of the invention.
Figure 2:
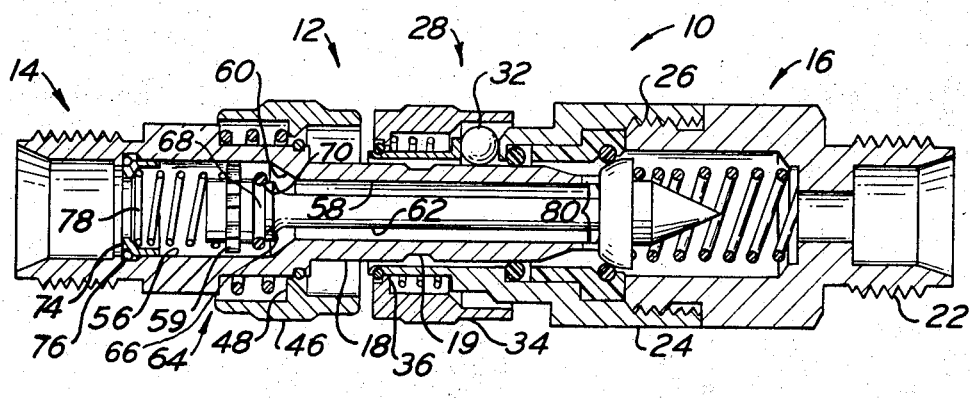
FIG. 2 is a longitudinal cross-sectional view taken on line 2—2 of FIG. 1 but showing the relationship between the female body portion and the male stem as the two parts are being coupled.
Figure 3:
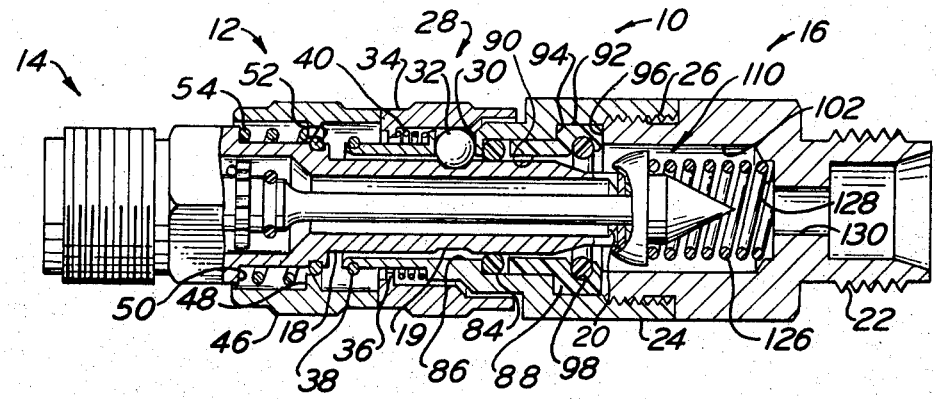
FIG. 3 is a longitudinal cross-sectional view similar to FIG. 2 but showing the coupling in the fully coupled position; and, FIG. 4 is an enlarged partial cross-sectional view of the body valve and seat.

Referring more particularly to the drawings, FIG. 1 illustrates a double-ended shut-off quick-connect coupling generally indicated by the numeral 10 which embodies a preferred form of the subject invention. The coupling shown includes a valved male stem 12 having a threaded end portion 14 for connecting the stem to tubing or the like in a conventional manner. The coupling also includes a female body portion 16 which is arranged to rotatably receive the stem 12. During coupling and uncoupling, the stem is longitudinally slidable with respect to the female body portion 16. As best shown in FIGS. 2 and 3, the male stem portion 12 is provided with an elongated stem 18 at the end opposite the threads 14. A groove 19 having sloped walls as shown, extend circumferentially about the stem portion 18. Also, at the end of portion 18, a flange 20 extends radially inward.

The hollow female body 16 is provided with external threads 22 which permit it to be connected to a tube or other fluid line. Rigidly mounted to the coupling body 16 at the end opposite the threads 22 is a generally tubular body extension portion 24 which, in the preferred embodiment, is secured to the coupling body by threads 26. It should be appreciated however, that this portion could be formed integrally with the body, if desired.

Carried within the tubular extension portion 24 is a locking detent mechanism generally indicated by the reference numeral 28. The detent mechanism 28 is arranged to cooperate with the tubular portion 18 of the male stem to positively lock the stem to the female body while permitting rapid connection and disconnection. The detent assembly 28 comprises a series of circumferentially spaced openings 30 which receive balls 32. (In the preferred embodiment, there are a plurality of circumferentially spaced balls; however, because of the manner in which the cross-sections are taken, only one is shown in the drawings.) The openings 30 are frusto-conical in shape with the minimum diameter being slightly less than the diameter of the balls so that the balls project radially inward while being prevented from passing into he female body when the male stem is withdrawn.

The balls 32 are contained within the openings 30 by a sleeve 34 carried on the body and having a radially directed flange 36. A retaining ring 38 is received on the end of the reduced diameter portion of the body extension 24 and prevents the sleeve 34 from coming off the end of the extension. A compression spring 40 is positioned between the flange 36 and a shoulder carried on the extension 24. As can be appreciated, when the sleeve 34 is biased to the position shown in FIG. 2, the balls 32 can move radially outward and the stem 18 can be withdrawn; however, when the coupling is assembled in the position of FIG. 3, the sleeve 34 retains the balls 32 in their radial inward position where they enter the circumferential groove 19 to interlock the male and female portions of the coupling.

Carried on the stem member 12 is a stem sleeve 46 having a flange 48 which is in close engagement with an enlarged portion of the stem located between the elongated tubular portion 18 and the threaded portion 14. An outwardly directed shoulder 50 adjacent the threaded portion 14 and a retaining ring 52 adjacent the elongated tubular portion 18 limit the axial movement of the sleeve 46. It should be noted that a compression spring 54 is positioned between the shoulder 50 and the flange 48 to normally bias the sleeve in the rightward direction (as viewed in FIGS. 1 through 3).

In coupling the members, the elongated tubular portion 18 is moved into the bore of the female coupling body 16 and slid axially thereof until the sleeve 46 abuts the body sleeve 34. As the advance of the stem into the bore continues, the greater force of the stem sleeve spring 54 overcomes the force of the body sleeve spring 40 and forces the body sleeve forward. Consequently, as the groove 19 in the stem moves into radial alignment with the openings 30, the body sleeve 34 slides over the balls and cams them radially inward into engagement with the groove 19.

The inward camming occurs at the time the groove 19 is aligned with the openings 30. FIG. 3 shows the coupling in the locked state. To uncouple, the stem sleeve 46 is manually retracted to the left permitting the body sleeve 34 to be moved to the left under the influence of the spring 40 thereby releasing the balls 32 so that they can move radially outward of the groove 19. It should be noted that the walls of the grooves 19 are tapered as shown so that, in effect, they provide a camming action for radial outward movement of the balls upon retraction of the body sleeve 34. With the body sleeve 34 moved to the left, the male stem can be readily removed. Formed within the bore of the stem member 12 is an enlarged bore 56 (see FIG. 2) and a coaxially aligned somewhat smaller bore portion 58 which extends through the tubular portion 18. The bores 56 and 58 are joined by a tapered annular shoulder 60 which serves as the valve seat for the male stem valve. An elongated valve core member 62 is mounted within the bores 56, 58. The right-hand end of the valve core 62 is of a diameter substantially less than the diameter of bore 58 and is arranged to extend through the end opening defined by the flange 20. The left-hand end of the valve core is of a diameter less than the diameter of the bore 56 but larger than bore 58. The enlarged head portion identified by the numeral 64 has a radially outwardly directed flange 66 and a groove 68. An O-ring 70 is positioned within the groove 68 and located so as to engage the inclined surface 60 when the stem is in the uncoupled position. Within an intermediate portion of the enlarged bore portion 56 is a retainer cup 74 held therein by a snap ring 76. The retainer cup 74 serves as a stop shoulder for a compression spring 78 which maintains the valve core 62 under a continuous rightward bias (as viewed in FIG. 2). Additionally, a guide member 59 is carried on the enlarged head and includes a plurality of fingers which extend radially outward into engagement with the bore to guide the core member while permitting flow therepast.

As can be readily seen, the spring 78 urges the valve core 62 and the O-ring 70 into sealing engagement with the tapered valve seat 60. To assure good axial alignment of the valve core with the bore of the stem member 12, the portion of the enlarged head immediately to the right of the groove 68 is of a diameter only slightly smaller than the diameter of the bore portion 58 so that upon the movement to the right, this portion enters the bore 58.

At the rightmost end of the stem portion 18, radial holes or slots 80 are formed adjacent to the flange 20 so that flow through the stem will occur through the holes 80. The holes 80 should have sufficient area to insure free flow of fluid through the stem member 12 of the coupling so that no pressure will build up within the stem which could act as a closing force on the valve core 62. It is also preferable that the radially inwardly directed flange 20 at the end of the stem slidingly engage the elongated portion of the core which extends therethrough. This positive support on the end of the core assures proper operation and axial movement of the valve during coupling and uncoupling.

As shown in FIG. 3, an O-ring 84 is carried within the bore 86 of the body extension 24. The O-ring 84 is arranged to make a seal with the elongated stem portion upon contact therewith while allowing relative sliding during coupling before the stem member has been inserted a sufficient distance to align the groove 19 with the ball members 32. Similarly, this O-ring provides a seal during the uncoupling operation during that period of time prior to the closing of the stem valve and the female body valve. An insert member 88 formed from a resilient material has a bore 90 of substantially the same diameter as the bore 86. A radially outwardly extending shoulder 92 is provided on the insert 88 and is received between the shoulder 94 formed on the body extension 24 and the end 96 on the body 16. Shoulder 92 seals the two body sections and acts as a packing in the bore. A groove 98 is formed within the insert 88. An O-ring 100 is positioned within groove 98 and, as will hereafter be noted, forms a valve seat for the female body valve.

The apparatus thus far described is relatively conventional and is shown and more fully described in U. S. Pat. No. 3,174,508 which is incorporated herein by reference. The important aspects of the invention reside in the valve arrangement in the female body section 16. This arrangement is shown in a greatly enlarged view in FIG. 4.

As previously discussed, in the prior coupling, the female body valve comprised a ball member sized so that its outer diameter was somewhat less than the diameter of the bore 102 but larger than the inner diameter of the O-ring 100. Because of the use of a ball-type valve, the space available for the compression spring was somewhat limited, Further, flutter or vibration of the ball member took place under certain conditions. The subject invention overcomes these problems and permits use of a substantially longer spring which simplifies selection of a spring having the proper constant for use in both pressure and vacuum applications. Specifically, in the subject invention, the valving member comprises a valve plug 110 having an end face 112 and a circumferentially continuous lip or flange 114 extending axially outward from the end face. It should be noted that the lip or flange 114 is sized so as to closely encircle the free end of the stem 18. Further, the inner face or wall 116 of the lip 114 is at an angle corresponding to the angle of the peripheral edge of the end of the stem. This provides positive interengagement between the stem and the valve member when the coupling is in the coupled position. A positive interengagement is further assured by a recess 119 which receives the end of core 62. As can be appreciated, lateral vibrations or movements of the valve stem are thus prevented. Extending to the right from the lip 114 is the valving surface 118 which is preferably of spherical configuration and corresponding to the ball previously used. A radially inwardly extending shoulder 120 if formed about the valving surface 118. At the inner edge of the shoulder 120, a short, cylindrical section 122 extends to the right and joins with a conical section 124. Conical section 124 improves the flow path as the fluid passes about the plug member. A compression spring 126 acts against the shoulder 120 to continually bias the plug toward the O-ring seat 100. Referring to FIG. 3, it will be noted that the compression spring 126 is received at its opposite end in a shoulder 128 formed at the end of the bore 102 about the passage 130.

Figure 4:
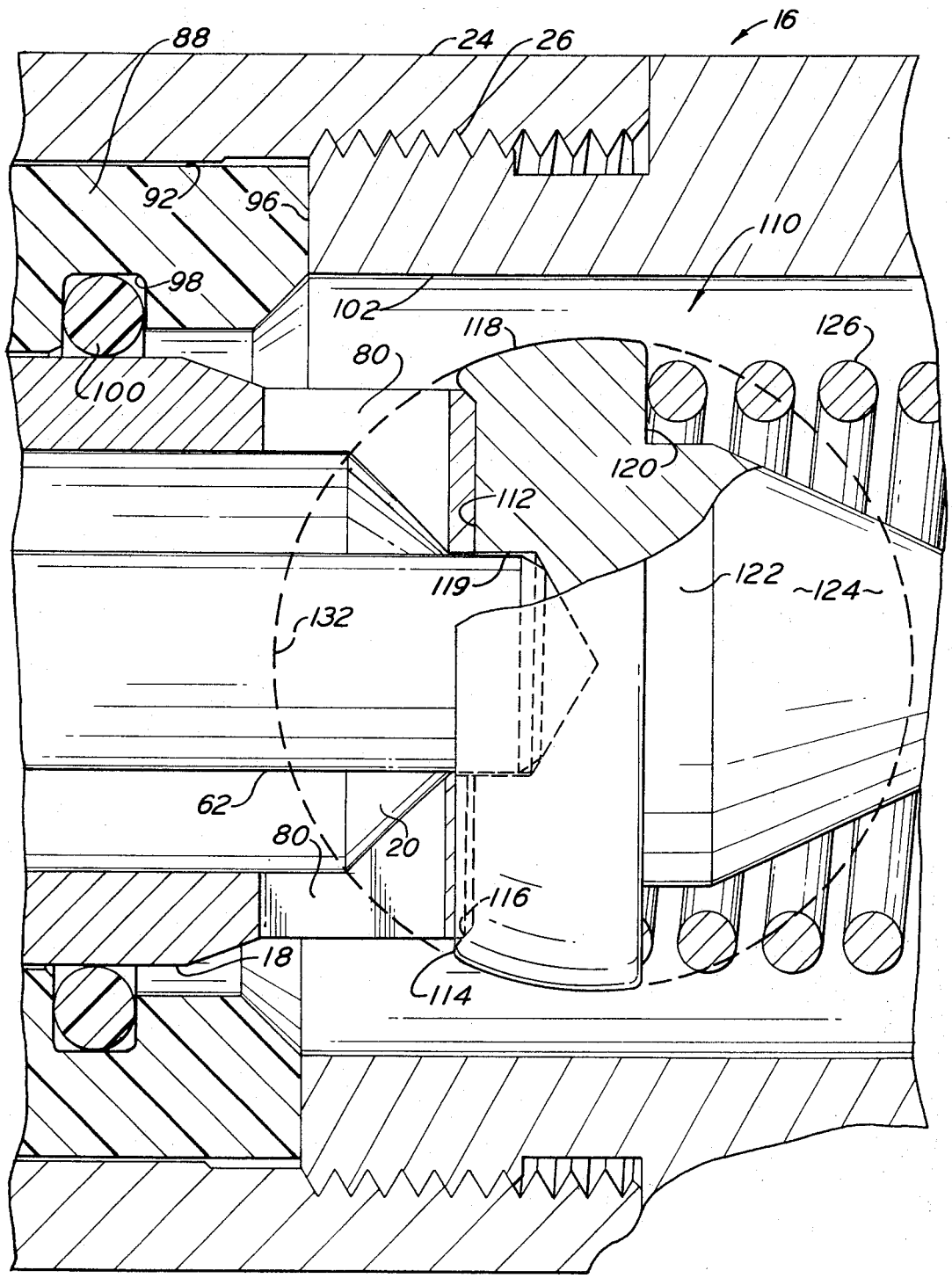

Because of the arrangement of the plug, substantial additional length is available for the compression spring 126. As shown in FIG. 4, a ball-type valve member having an equivalent sealing diameter with the seal portion 118 would require the total length or space illustrated by the dotted line 132. This greatly reduces the space available for the spring and, when compared to the subject plug member, requires an axial space at least nearly as great as the radius of the sealing surface 118. Moreover, the use of the ball is less desirable from a flow standpoint since there are no means of preventing flutter or shifting of the ball.

The invention has been described in great detail sufficient to enable one of ordinary skill in the tube coupling art to make and use the same. Obviously, modifications and alterations of the preferred embodiment will occur upon a reading and understanding of the specification and it is my intention to include all such modifications and alterations as part of my invention insofar as they come within the scope of the appended claims.

What is claimed is:

1. A shut-off guick-connect tube coupling comprising in combination:
   a hollow male stem having a through flow passage;
   a hollow female body having a through flow passage;
   means for releasably connecting said male stem in said female body;
   said male stem including a stem valve member carried for reciprocation therein and having an operating portion extending out of its through flow passage;
   said male stem having an outer diameter substantially less than the diameter of said seat and extending through said seat when in the coupled position; a plug valve member carried in said female body and continually biased toward said seat by a coil spring, said plug valve member having an end face which is engaged by the end of said stem and the operating portion of said stem valve, an axially extending peripheral flange surrounding said end face for circumferentially engaging the end of said stem and a recess in said end face for closely receiving said operating portion, the outer wall of said flange defining a sealing surface adapted to engage said seat, the side of said plug opposite said end face tapering radially inward and being received in said coil spring, said flange and said opening serving to stabilize said plug valve member while said coupling is being connected and while it is connected.

2. A coupling as defined in claim 1 wherein said end face is generally planar and the inner wall of said flange is inclined, the end of said stem having a taper corresponding to the incline of the inner wall of said flange and adapted to closely mate therewith.

3. The coupling as defined in claim 2 wherein said sealing surface is convex and said end face is generally flat.

4. The coupling as defined in claim 3 including a shoulder formed at the juncture between said sealing surface and said radially inwardly tapering end of said plug, said coil spring being in engagement with said shoulder.

5. The coupling as defined in claim 1 wherein said plug member has a maximum diameter substantially less than the diameter of the through flow passage in said female body but larger than the diameter of said coil spring.

6. The coupling as defined in claim 5 wherein said plug member is of a total length greater than its diameter and wherein a major portion of its length is received within said coil spring.

7. The coupling as defined in claim 5 wherein said plug member is supported and guided only by said spring and said male stem.

* * * * *